(12) United States Patent
Lee

(10) Patent No.: US 6,523,990 B1
(45) Date of Patent: Feb. 25, 2003

(54) HAND BLENDER

(75) Inventor: William Kwok Kay Lee, Hong Kong (HK)

(73) Assignee: Main Power Electrical Factory Ltd., Hong Kong (HK)

( * ) Notice: Subject to any disclaimer, the term of this patent is extended or adjusted under 35 U.S.C. 154(b) by 0 days.

(21) Appl. No.: 10/217,101

(22) Filed: Aug. 12, 2002

(51) Int. Cl.[7] .......................... A47J 43/044; A47J 43/07
(52) U.S. Cl. ........................................ 366/129; 99/348
(58) Field of Search ............................ 99/348; 366/129, 366/130, 347, 349, 197, 199, 207, 342, 343; 241/168, 169, 169.1, 285.2, 285.3; 416/244 R, 63

(56) References Cited

U.S. PATENT DOCUMENTS

| | | | | |
|---|---|---|---|---|
| 2,805,050 A | * | 9/1957 | Choppinet | ................. 99/348 X |
| 3,299,924 A | * | 1/1967 | Hanschitz | ................. 99/348 X |
| 4,405,998 A | * | 9/1983 | Brison | .................... 416/244 R |
| 5,316,382 A | * | 5/1994 | Penaranda et al. | ........... 366/129 |
| 5,368,384 A | * | 11/1994 | Duncan et al. | ............ 99/348 X |
| 5,810,472 A | * | 9/1998 | Penaranda et al. | ........ 416/63 X |
| 5,836,684 A | * | 11/1998 | Safont et al. | ................ 366/129 |
| 5,863,118 A | * | 1/1999 | Ackels | ....................... 99/348 X |
| 6,186,656 B1 | * | 2/2001 | Penaranda et al. | ........... 366/129 |
| 6,193,404 B1 | * | 2/2001 | Calange | ...................... 366/129 |
| 6,293,691 B1 | * | 9/2001 | Rebordosa et al. | .......... 366/129 |
| 6,325,532 B1 | * | 12/2001 | King et al. | ............. 366/601 X |
| 6,398,403 B1 | * | 6/2002 | Rebordosa et al. | .......... 366/129 |

* cited by examiner

Primary Examiner—Timothy F. Simone
(74) Attorney, Agent, or Firm—Jackson Walker L.L.P.

(57) ABSTRACT

A hand blender includes a work shaft and an elongate housing enclosing the work shaft. An upper housing portion encloses a motor for driving the work shaft. A work element is disposed at the output end of the work shaft. At the second end of the elongate housing is a bell-shaped housing portion defining a blending chamber that encloses the work element. A substantially spherical-shaped bush is disposed on the work shaft. A sleeve located within the elongate housing portion has a substantially convex shaped recess adapted to receive the bush to support the work shaft within the housing.

5 Claims, 4 Drawing Sheets

HAND BLENDER

BACKGROUND OF THE INVENTION

1. Field of the Invention

The invention relates to Hand Blenders.

2. Background Information

Hand blenders, sometimes referred to as Stick Blenders, comprise an elongate work shaft enclosed in a housing. At the top of the housing is a motor for driving the shaft. At the bottom, output end, of the shaft is a blending blade which is introduced into a medium to be blended. The work shaft on typical hand blenders is approximately 6 to 8 inches (150 to 200 millimetres) long.

The work shaft must be securely and robustly mounted within the housing, especially near the blending blade, to facilitate long trouble free life of the blender. Because of the length of the shaft a degree of flex and movement is to be expected which can cause problems with known shaft mounting systems.

SUMMARY OF THE INVENTION

It is an object of the present invention to provide a hand blender which overcomes or ameliorates the above problem, or which at least provides the public with a useful alternative.

According to a first aspect of the invention there is provided a hand blender including:

- a work shaft having an input end and an output end,
- an elongate housing portion enclosing the work shaft, the elongate housing portion having a first end and a second end,
- a motor in communication with the input end of the work shaft,
- an upper housing portion disposed at the first end of the elongate housing portion and enclosing the motor,
- a work element disposed at the output end of the work shaft,
- an open housing portion disposed at the second end of the elongate housing portion, the open housing portion defining a blending chamber enclosing the work element,
- a cover plate disposed within the blending chamber and adjacent the second end of the elongate housing portion, the cover plate having an aperture for the work shaft to pass through,
- a substantially spherical shaped bush disposed on the work shaft, and
- a sleeve with a first end and a second end and a bore between the first and second ends, the sleeve located within the elongate housing portion with the work shaft passing through the bore, and a substantially concave shaped recess in the first end of the sleeve, the recess concentric with the bore and adapted to receive the bush.

Preferably, the bush is fixedly engaged with the work shaft and adapted to operationally rotate within the recess of the sleeve.

Preferably, the cover plate includes a skirt extending concentrically to the aperture, and shaft seal located within the skirt.

Preferably, the recess is integral with the bore and has a skirt longitudinally enclosing the bush.

Preferably, the hand blender includes a locking washer with tabs to retain the bush within the recess.

Further aspects of the invention will become apparent from the following description, which is given by way of example only.

BRIEF DESCRIPTION OF THE PREFERRED EMBODIMENT

Figure 1:
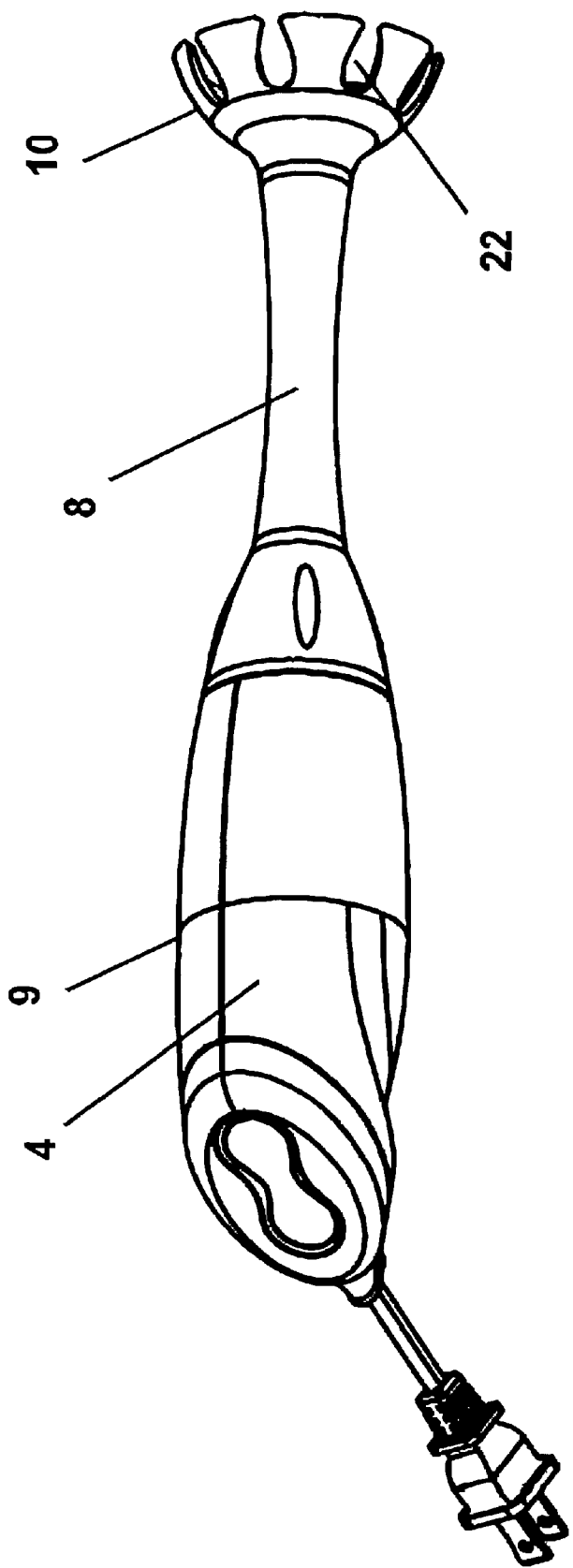
Figure 2:
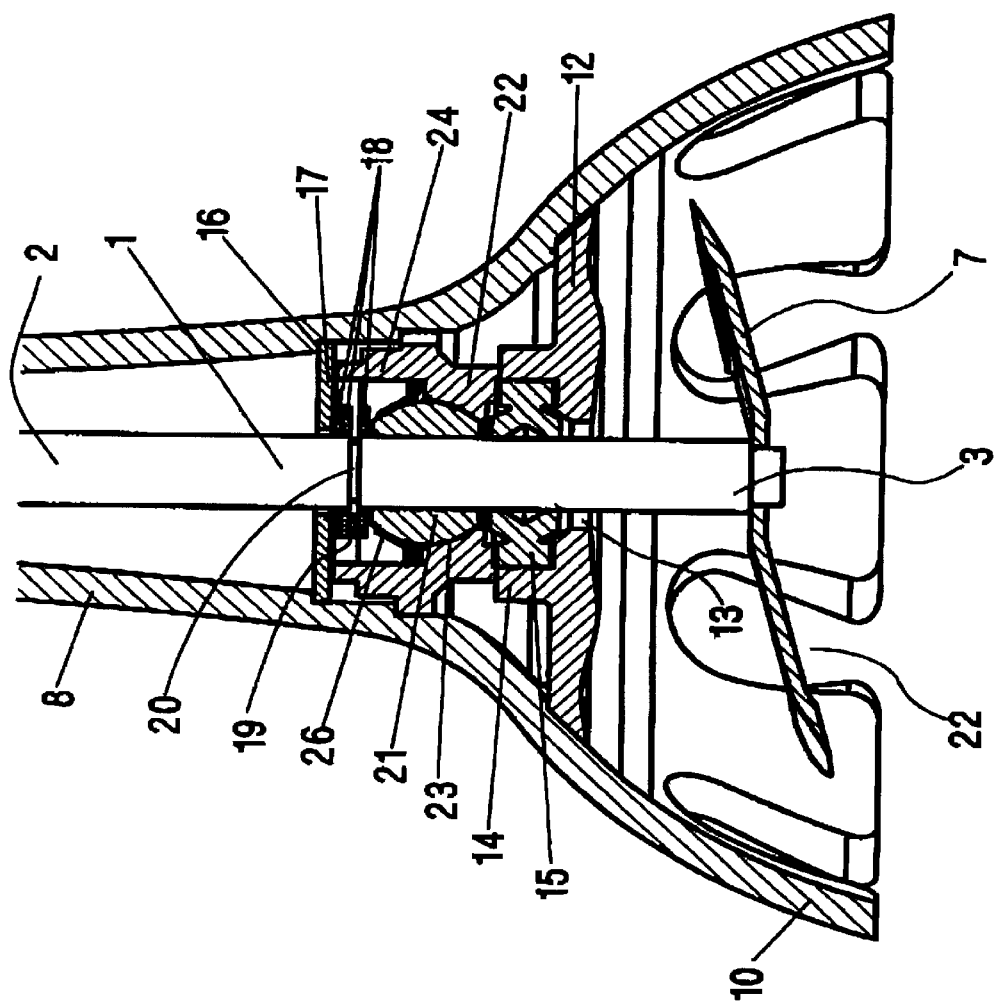
Figure 3:
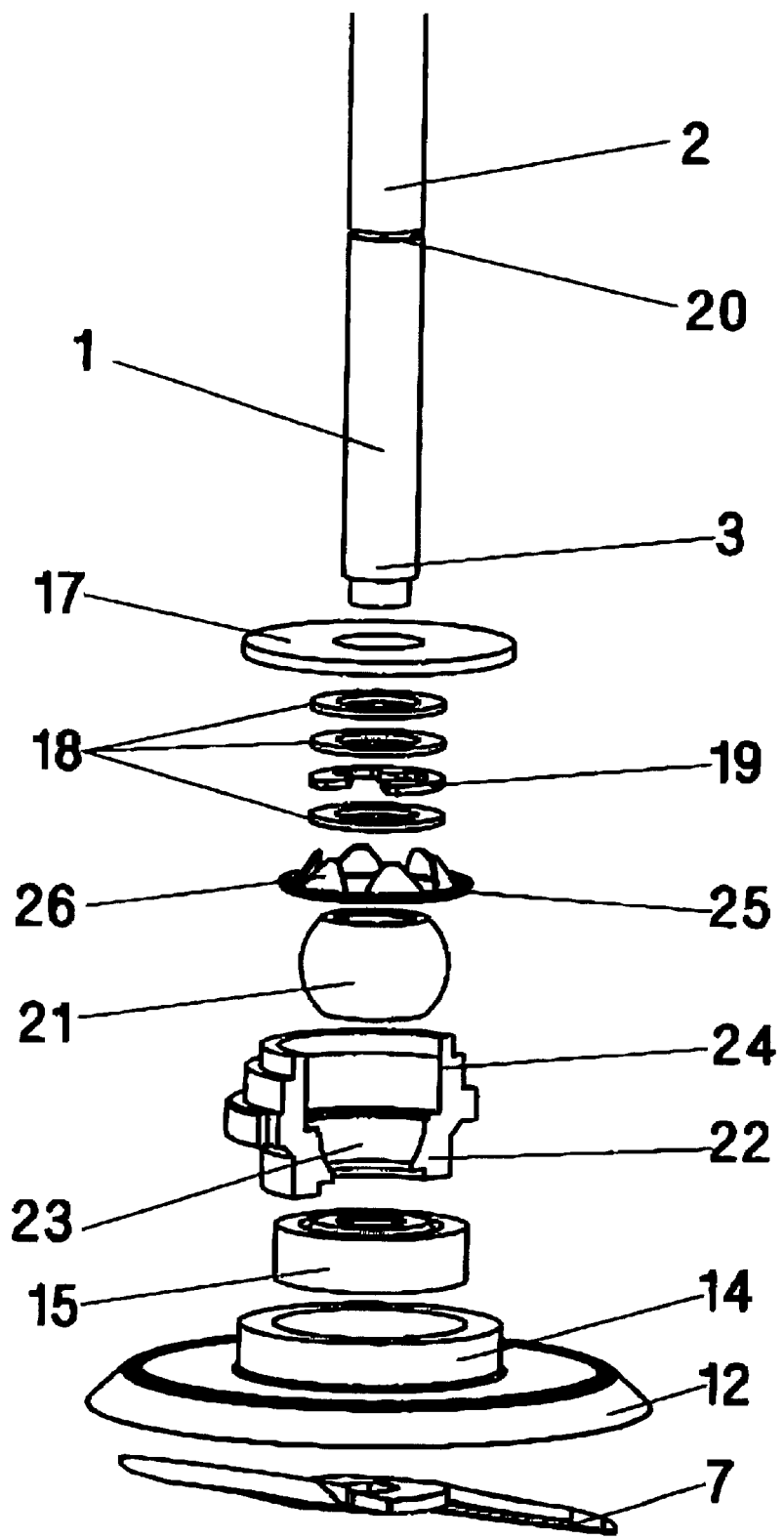
Figure 4:
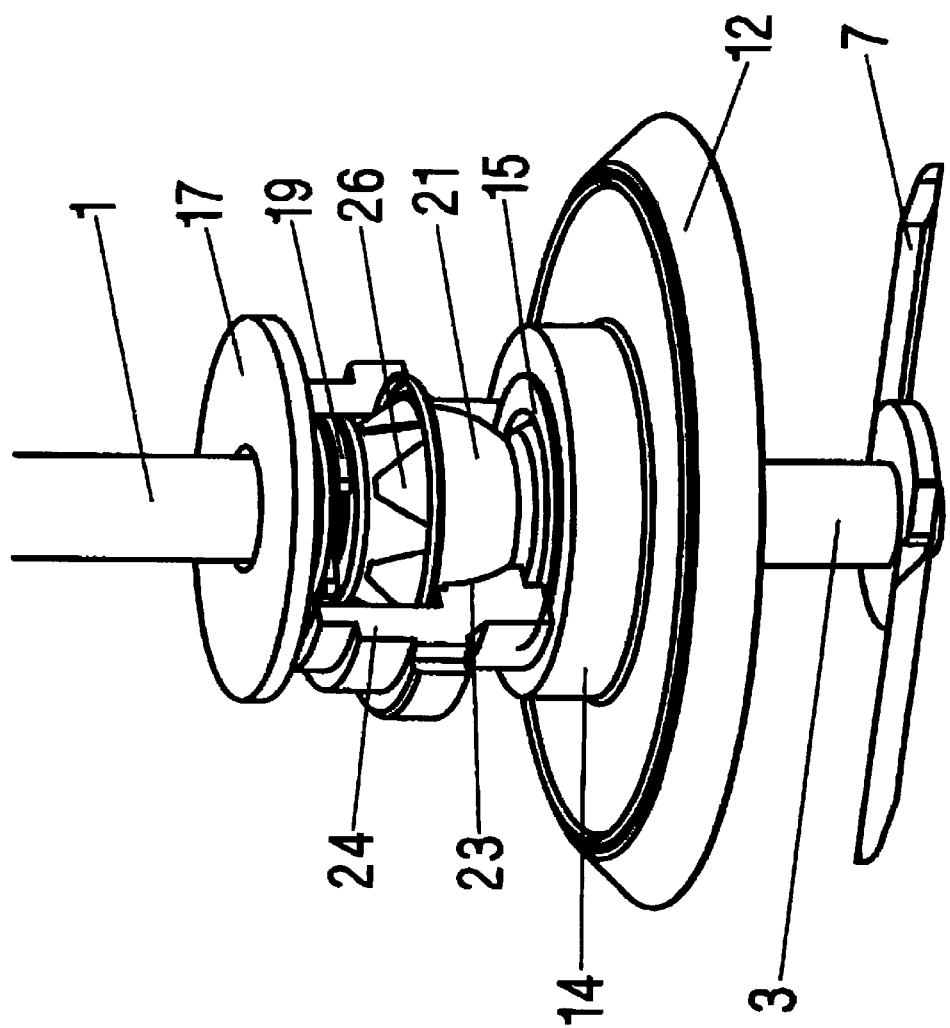

Embodiments of the invention will now be described with reference to the accompanying drawings in which FIG. 1 is a perspective view of a hand blender, FIG. 2 is a sectional view of the lower end of a hand blender according to the invention, FIG. 3 is an exploded view of an assembly within the lower end, and FIG. 4 is an assembled view of the assembly.

DESCRIPTION OF THE PREFERRED EMBODIMENTS

Referring to the drawings, the preferred embodiment of a hand blender according to the invention includes a work shaft 1 having an input end 2 coupled to a drive motor 4, and an output end 3 to which a work element, in the form of blending blade 7, is attached.

The work shaft 1 is enclosed within an elongate housing 8 that extends to an upper housing portion 9 which encloses motor 4. The upper housing portion 9 may also be shaped to fit snugly in the palm of a users hand so as to provide a gripping handle for the hand blender.

Opposite handle portion 9 elongate housing 8 extends to an open bell-shaped portion 10 that defines a blending chamber 11. Bell-shaped portion 10 encloses blending blade 7 within blending chamber 11.

The lower periphery of bell-shaped housing portion 10 has a plurality of scallop-shaped cutaway portions 22 around its periphery. These cutaway portions 22 facilitate the flow of the blended medium through blending chamber 11 under the affect of blending blade 7.

A cover plate 12 is disposed at the top of blending chamber 11 to close the blending chamber from elongate housing 8. Cover plate has an aperture 13 through which work shaft 1 extends into blending chamber 11. Concentric to aperture 13 is an upwardly extending skirt 14 adapted to receive and locate a shaft seal 15 for aperture 13.

The inner wall of elongate housing 8 has step 16 against which rests a flat block washer 17. Work shaft passes through the aperture in block washer 17. On work shaft output end 3 of block washer 17 are three smaller concentric washers 18. A circlip 19 is received within a groove 20 in the circumference of work shaft 1 to locate the washers.

A spherical bush 21 is fixedly mounted on work shaft 1 at a position between circlip 19 and shaft seal 15. Within elongate housing 8 is a bush sleeve 22. Bush sleeve 22 engages against the inner wall of elongate housing 8 to frictionally locate it within elongate housing a between block washer 17 and cover plate 12. A bore 23 extends through sleeve 22 through which work shaft 1 passes.

The inner surface of bore 23 is substantially concave shaped to receive the spherical bush 21 within the bore. A concentric skirt extends concentrically upwards from concave bore 23 to enclose the bush 21. A lock washer 25 locates within concentric skirt 24. Extending radially inwards and upwardly from the inner periphery of lock washer 25 are tabs 26. Tabs 26 retain bush 23 within concave bore 21.

The combination of spherical bush 21 received within bush sleeve 22 provides a bush type bearing to rotatably support the output end 3 of work shaft 1 within elongate housing 8. The spherical nature of the bearing makes it more tolerant to miss-alignment of work shaft 1 and housing 8 due to manufacturing tolerances and operational stresses.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claim is:

1. A hand blender including;
    a work shaft having an input end and an output end,
    an elongate housing portion enclosing the work shaft, the elongate housing portion having a first end and a second end,
    a motor in communication with the input end of the work shaft,
    an upper housing portion disposed at the first end of the elongate housing portion and enclosing the motor,
    a work element disposed at the output end of the work shaft,
    an open housing portion disposed at the second end of the elongate housing portion, the open housing portion defining a blending chamber enclosing the work element,
    a cover plate disposed within the blending chamber and adjacent the second end of the elongate housing portion, the cover plate having an aperture for the work shaft to pass through,
    a substantially spherical shaped bush disposed on the work shaft, and
    a sleeve with a first end and a second end and a bore between the first and second ends, the sleeve located within the elongate housing portion with the work shaft passing through the bore, and a substantially convex shaped recess in the first end of the sleeve, the recess concentric with the bore and adapted to receive the bush.

2. A hand blender as claimed in claim 1 wherein the bush is fixedly engaged with the work shaft and adapted to operationally rotate within the recess of the sleeve.

3. A hand blender as claimed in claim 1 wherein the cover plate includes a skirt extending concentrically to the aperture, and shaft seal located within the skirt.

4. A hand blender as claimed in claim 1 wherein the recess is integral with the bore and has a skirt longitudinally enclosing the bush.

5. A hand blender as claimed in claim 1 including a locking washer with tabs to retain the bush within the recess.

* * * * *